Sept. 9, 1958  R. K. LEINHART  2,851,063
AUTOMATIC WEIGHING AND FILLING MACHINE
Filed May 2, 1952  5 Sheets-Sheet 1
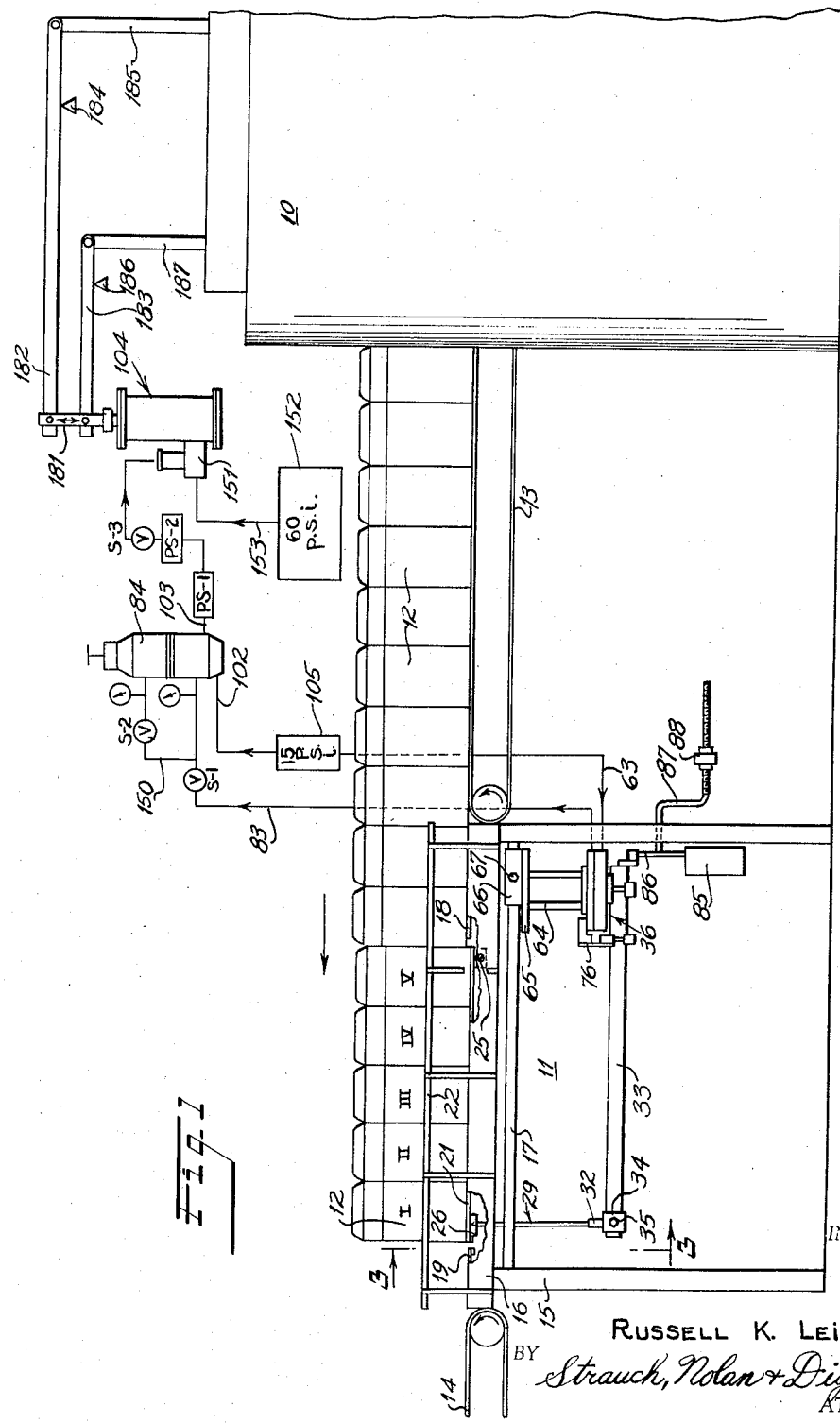
INVENTOR
RUSSELL K. LEINHART
BY Strauch, Nolan & Diggins
ATTORNEYS

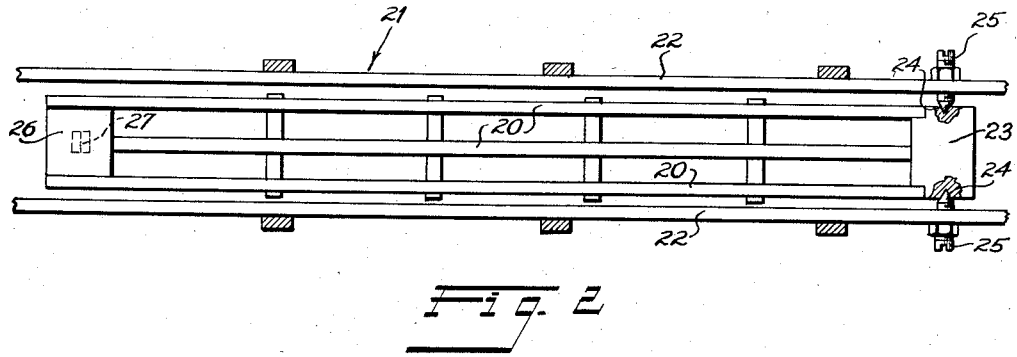
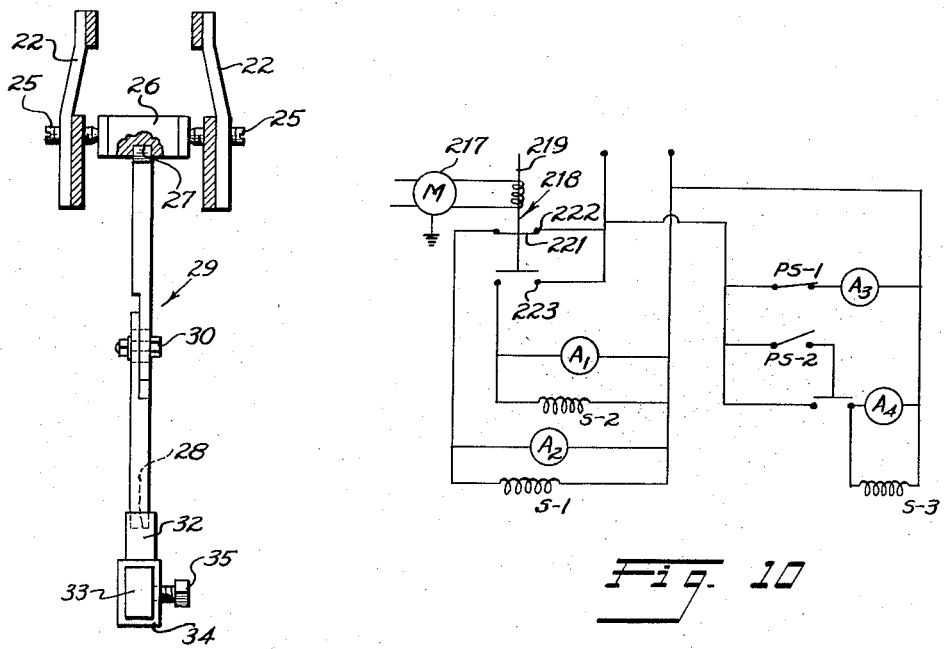

Sept. 9, 1958 R. K. LEINHART 2,851,063
AUTOMATIC WEIGHING AND FILLING MACHINE
Filed May 2, 1952 5 Sheets-Sheet 3
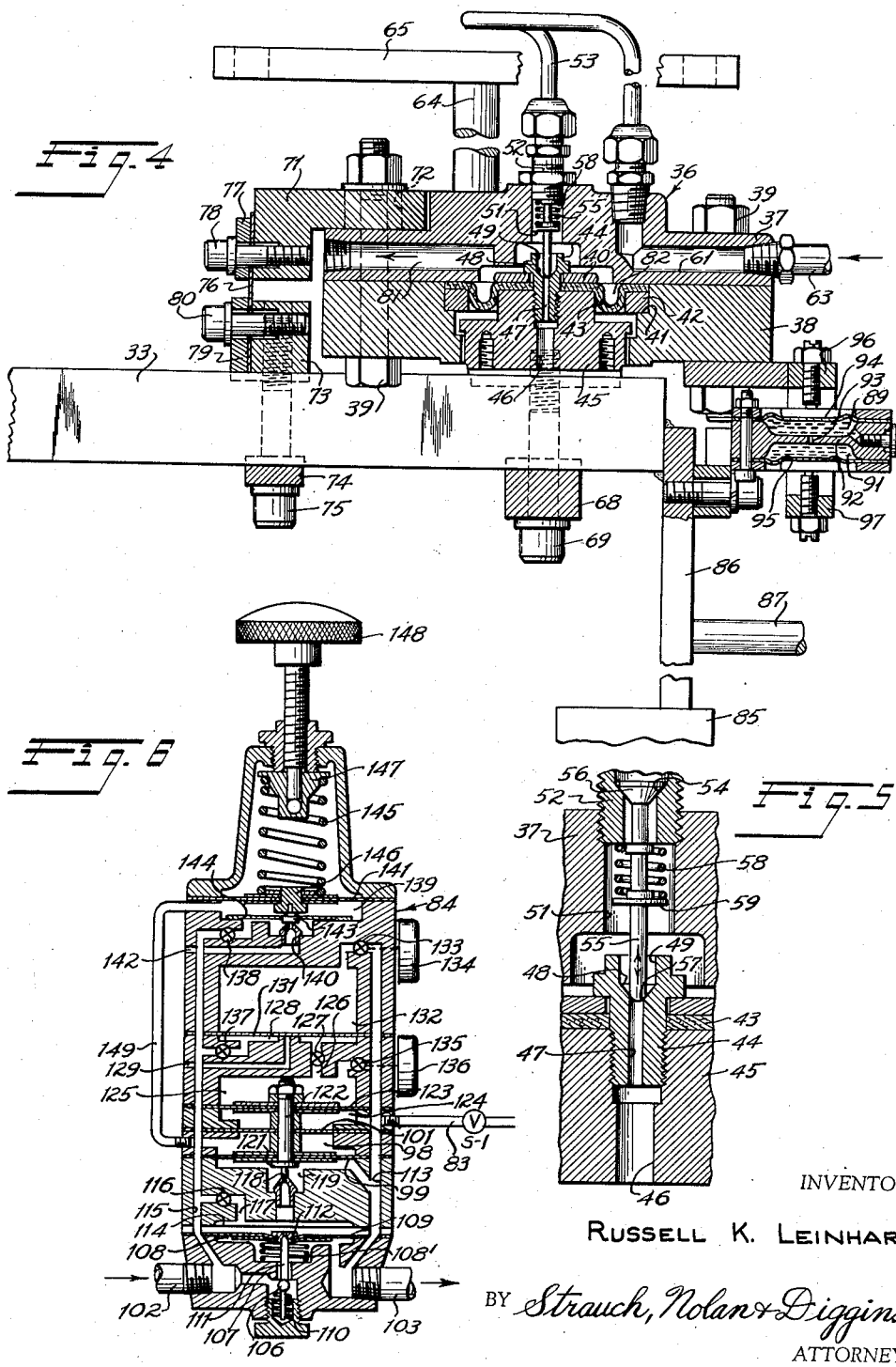
INVENTOR
RUSSELL K. LEINHART
BY Strauch, Nolan & Diggins
ATTORNEYS Sept. 9, 1958 R. K. LEINHART 2,851,063
AUTOMATIC WEIGHING AND FILLING MACHINE
Filed May 2, 1952 5 Sheets-Sheet 4
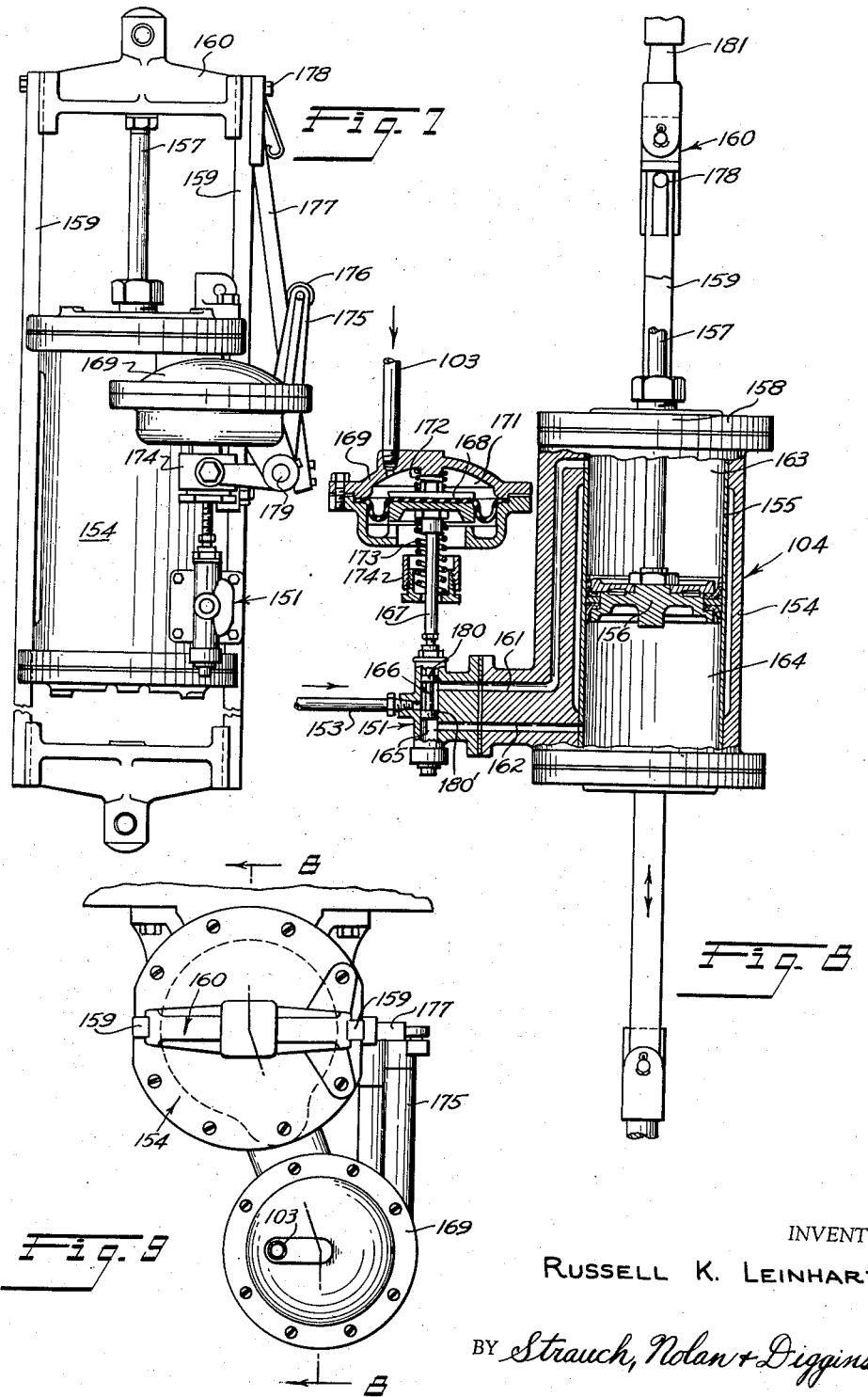
INVENTOR
RUSSELL K. LEINHART
BY Strauch, Nolan + Diggins
ATTORNEYS Sept. 9, 1958 R. K. LEINHART 2,851,063
AUTOMATIC WEIGHING AND FILLING MACHINE
Filed May 2, 1952 5 Sheets-Sheet 5
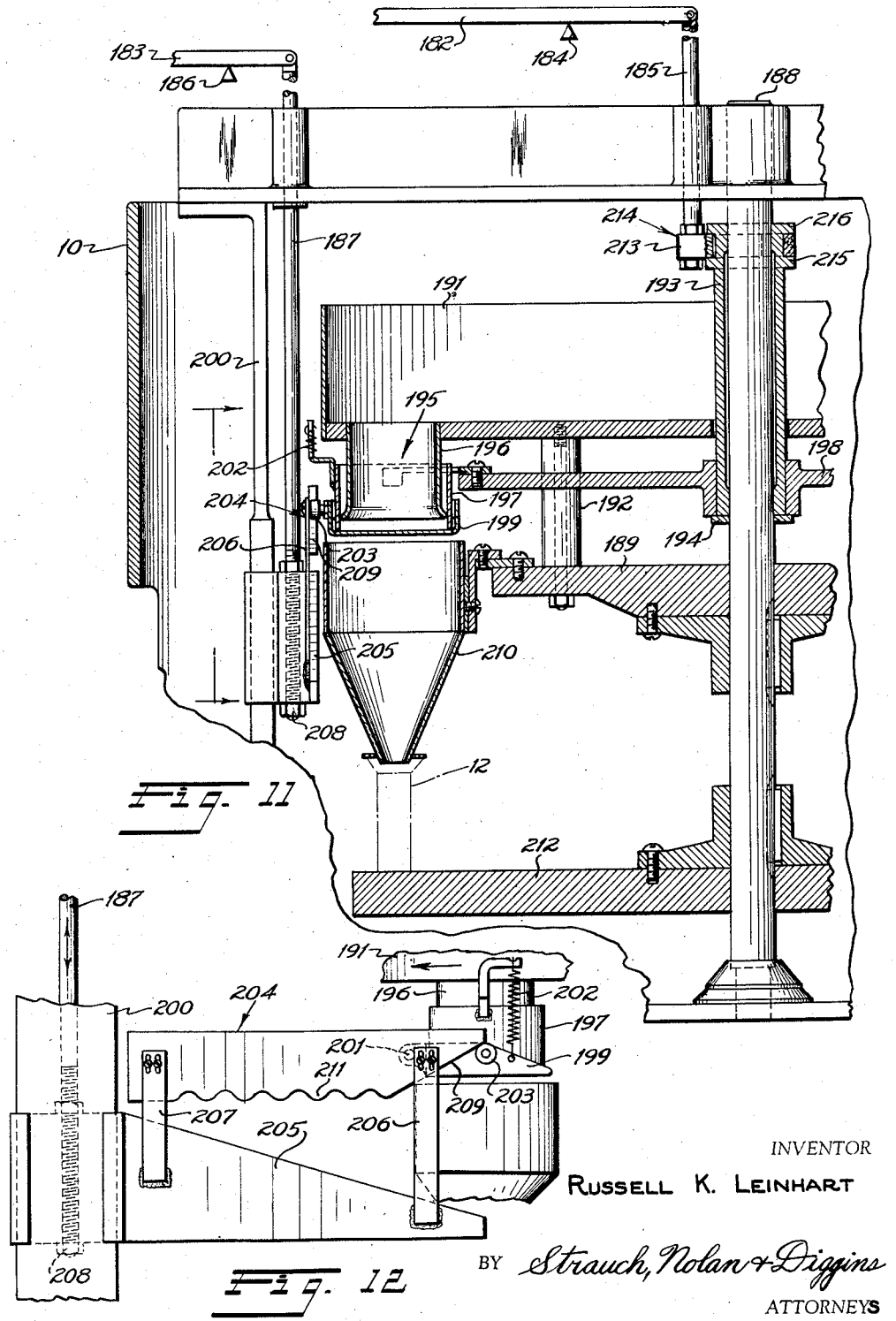
INVENTOR
RUSSELL K. LEINHART
BY Strauch, Nolan + Diggins
ATTORNEYS

United States Patent Office 2,851,063
Patented Sept. 9, 1958

2,851,063

AUTOMATIC WEIGHING AND FILLING MACHINE

Russell K. Leinhart, Morristown, N. J., assignor to Colgate-Palmolive Company, Jersey City, N. J., a corporation of Delaware Application May 2, 1952, Serial No. 285,713

28 Claims. (Cl. 141—83)

This invention relates to automatic weighing and control apparatus and particularly to such apparatus for maintaining a continuous check on a carton filling machine for accurately and reliably supplying a predetermined weight of material contents to each carton.

The invention in its preferred embodiment is concerned with automatic weighing and control apparatus disposed at the outgoing end of a continuously operating carton filling machine. Cartons are continuously weighed in a very sensitive apparatus which is instantly responsive to overloaded and underloaded cartons to correct the filling machine.

It is the major object of my invention to provide a novel, accurate, sensitive and quickly responsive control for a continuous carton filling machine or the like wherein variations in carton content weight are speedily detected and corrected substantially immediately upon detection.

It is a further object of the invention to provide a sensitive weighting apparatus that is novel per se as well as in combination with control devices for a carton filling machine.

A further object of the invention is to provide a novel automatic weighing apparatus that generates a fluid pressure control output which varies sensitively with the material being weighed.

A further object of the invention is to provide a novel and very sensitive automatic weighing apparatus and an associated condition correcting mechanism speedily responsive thereto.

In the preferred embodiment of the invention to be described later, the filled cartons that issue from the filling machine are weighed as they move over a scale platform which actuates a pressure sensitive device having an output pressure that acts through a pressure controller to operate a pneumatic motor to automatically regulate the filling mechanism of the carton filling machine.

A further object of the invention is therefore to provide a novel automatic weighing and container filling machine control apparatus wherein the output of the filling machine is continuously weigh checked and a variable control pressure generated during the weighing operation is applied through suitable modifying devices to vary the filling mechanism whenever the containers are overloaded or underloaded.

It is a further object of the invention to provide a novel automatic weighing apparatus wherein a scale platform is supported by a beam operatively connected to a fluid pressure control device which produces a predetermined fluid pressure output only when a predetermined weight is passing over the scale platform.

A further object of the invention is to provide a novel weighing device comprising a platform, a beam supporting the platform and operably connected to the diaphragm of a pressure regulator and a load on the beam to counterbalance the weight on the platform and produce a predetermined output pressure from said regulator whenever the load on the platform is within a normal range.

A further object of the invention is to provide in an automatic continuous weighing apparatus a novel arrangement compensating for the kinetic energy derived from articles to be weighed as they are delivered to the sacle platform.

Further objects of the invention will appear as the description proceeds in connection with the amended claims and the appended drawings wherein:

Figure 1 is a diagrammatic view of the invention according to a preferred embodiment illustrating the scale and control connections;
Figure 2 is a top plan view of the scale platform;
Figure 3 is an end elevation of the scale mechanism;
Figure 4 is an enlarged section illustrating the pressure regulator and its connection to the scale beam;
Figure 5 is an enlarged fragmentary section illustrating the poppet valve of the pressure regulator;
Figure 6 is an enlarged section illustrating the details of the pressure control device between the scale and the air motor for actuating the carton filling machine adjustment;
Figure 7 is a side elevation of the air motor and its controls;
Figure 8 is a section through the air motor of Figure 7;
Figure 9 is a top plan view of the air motor of Figures 7 and 8;
Figure 10 is a schematic diagram of the valve controls;
Figure 11 is an enlarged side elevation partly broken away and in section illustrating the volumetric and cam adjustments in the filling machine; and
Figure 12 is an enlarged fragmentary view of the cam adjustment.

The apparatus according to the invention comprises a pneumatic scale assembly indicated at 11 toward which upright cartons 12 that have been filled at a filling station 10 are continuously advanced on a constant speed belt conveyor 13, and from which the cartons depart on a constant speed faster conveyor 14.

In practice I have found it advantageous to construct shelves 18 and 19 and platform 21 of parallel rods 20 (Figure 2) of a hard smooth plastic such as Teflon, but it will be appreciated that any smooth slide surfaces may be provided so that the cartons on driven belt 13 will push those ahead of them along shelf 18, platform 21 and shelf 19 in succession. Belt 14 moves the cartons away from the scale assembly faster than they are delivered to it to prevent jamming.

Parallel side rails 22 upstand from side members 16 and are spaced apart just greater than the width of a carton, so that the cartons are guided straight through the scale assembly. I have found it highly advantageous to dispose the level of platform 21 a small distance, about $\frac{1}{16}$ of an inch is satisfactory, below the level of platform 18, and shelf 19 is disposed the same small distance below the level of platform 21, as exaggeratedly shown in Figure 1. These features greatly facilitate passage of the cartons through the scale assembly. The length of platform 21 is such that it accommodates five cartons in close succession, and since the cartons are fed across the scale by the pressure of those behind them there are always five cartons on the scale platform during normal operation, and the weight of these five cartons is constantly active to control the carton filling apparatus. The length of each carton in the preferred embodiment is six inches, so that platform 21 is thirty inches long.

Referring to Figure 2, platform 21 is pivotally mounted about a transverse horizontal axis at its end adjacent shelf 18. An end member 23 of the platform has its opposite ends formed with conical sockets 24 that fit with conical tipped coaxial screws 25 threaded in side members 16. At its other end, a platform cross member 26 is formed on its underside with a transverse V-slot 29 which is connected by a knife edge 27 of a vertical bar secured upon a generally horizontal scale beam 33. The knife edges 27 and 28 reduce friction and provide rocking connections between the platform and scale beam during operation. Bar 29 is preferably in two vertically adjustable sections connected by a bolt assembly 30 which projects through slots in the sections and locks the vertical adjustment. This vertical adjustment is to level the scale platform 21 parallel to shelf 18 when beam 33 is horizontal. Arm 32 is preferably connected to beam 33 by a collar 34 releasably clamped by a set-screw 35 for a purpose to appear.

Scale beam 33 is mounted at its other end upon a pressure sensitive device indicated at 36 in Figure 1 and illustrated in detail in Figure 4. This device comprises an upper casing part 37 secured to a lower annular casing part 38 as by bolts 39. Casing part 38 has an annular shoulder 41 in which is seated a rigid ring 42, and when bolts 39 are drawn tight the outer periphery of a flexible diaphragm 43 is clamped fluid tight between the casing parts.

The inner periphery of diaphragm 43 is clamped between the flange 40 of a valve seat member 44 and a block 45 disposed freely within annular casing part 38. Member 44 has a stem threaded into the upper part of a bore 46 which extends through block 45, so that when member 44 is rotated it functions as a bolt to secure it tightly to the diaphragm 43 and block 45.

A small diameter exhaust port 47 is formed centrally of member 44, and this enlarges in succession to a conical seat portion 48 and an enlarged bore 49 at the upper end, as shown in Figure 5. Coaxial with bore 46 the upper casing part is formed with a bore 51 into which is fitted a coupling 52 for conduit 53, and hollow coupling 52 contains a poppet valve shown diagrammatically in Figure 5.

Internally coupling 52 is formed with a restricted conical valve seat 54. A valve stem 55 has a solid conical head 56 adapted to seat on seat 54 and a rounded lower end 57 seating at the bottom of cone 48. A coiled compression spring 58 reacts between a collar 59 fixed to stem 55 and the end of coupling 52 to normally close the inlet valve 52 and maintain the end 57 substantially in contact with member 44 to normally close the exhaust port.

Casing part 37 is formed with a side bore 61 which is in turn connected to coupling 52 by conduit 53. A suitable inlet conduit providing fluid at a predetermined inlet pressure is connected to bore 61 at 63.

The entire casing is supported by four rigid legs 64 which are essentially long casing part connecting studs welded at their upper ends to a plate 65 integral (Figure 1) with a collar 66 releasably clamped on rod 17 as by set screw 67. The effective length of beam 33 may thus be altered by loosening set screws 67 and 35 and sliding the entire casing and scale beam assembly along the bar 17, beam 33 sliding through collar 34 during this adjustment. This adjustment provides a means of achieving various ratios of pneumatic output pressure from device 36 to weight on the scale platform. When the collar 34 is at its outermost position this ratio is about 1.6 to 1 which is very satisfactory in the illustrated example.

Referring again to Figure 4, the other end of scale beam 33 is fixed to block 45 as by a strap 68 and studs 69. Beam 33 is fulcrumed on the casing in the following manner. A block 71 is adjustably mounted on casing part 37 as by a slot 72 traversed by one of the bolts 39. A block 73 is fixed to beam 33 near the edge of the casing as by a strap 74 and studs 75. A fulcrum comprising a laminated thin spring steel plate assembly 76 is secured at one end to block 71 as by a strap 77 and screws 78, and is secured to block 73 as by a strap 79 and screws 80.

Thus, when a load is on platform 21, the end of beam 33 remote from device 36 will drop. The beam 33 will fulcrum about assembly 76 and urge block 45 upwardly. Upward movement of block 45 pushes valve stem 55 upward to unseat the valve at 56 and admit air or another gas under pressure to diaphragm chamber 82 through conduits 63, 61 and 53 to oppose the force acting on beam 33, as will be explained in detail later.

An outlet passage 81 is connected at one end to diaphragm chamber 82 and at its other end (Figure 1) to a conduit 83 leading to a pressure control device 84 such as that illustrated in detail in Figure 6.

Referring to Figures 1 and 4, a weight 85 is secured upon the end of beam 33 as by a welded arm 86, and a lever 87 projecting from arm 86 carries an adjustable weight 88, so that the balance of beam 33 about fulcrum 76 may be sensitively varied. Between the relatively rigid casing part 38 and the arm 86 secured to beam 33, a stabilizer unit of known characteristics is provided to dampen oscillation of the beam during operation of the scale assembly. This stabilizer as illustrated has fluid chambers 89 and 91 separated by a wall 92 having a small opening 93. The opposite chamber walls 94 and 95 are flexible and connected to members 96 and 97 rigid with the casing part 38 and beam 33 respectively.

In the pressure control device at 84 (Figure 6), the measured variable pressure derived from outlet 81 of the pressure sensitive device 36 is admitted to a chamber 124 disposed between flexible diaphragms 101 and 123. The function of this measured variable pressure is to control the drop in pressure between a higher pressure air supply line 102 and a control pressure outlet line 103 which, as shown in Figure 1, is connected to the air motor cylinder assembly 104 that regulates the carton filling mechanism.

The line 102 is connected to a source 105 which may be the same fifteen pound per square inch (gauge pressure) air pressure source that supplies conduit 63. The inlet pressure in conduit 102 is separated from the outlet pressure of conduit 103 by a pilot inlet valve 106 that controls communication through a passage 107 leading to chamber 108 disposed at one side of a flexible diaphragm assembly 109. A spring 110 surrounding the lower end of valve stem 111 normally urges the pilot inlet valve toward closed position. The upper end of valve stem 111 normally coacts with an apertured seat 112 on diaphragm 109 to provide a pilot exhaust valve, and spring 108' normally urges seat 112 upwardly in Figure 6. Chamber 108 is connected directly to conduit 103. Chamber 108 is also connected by passage 113 to a chamber 119 at the opposite side of diaphragm 99 from chamber 98.

On the opposite side of diaphragm assembly 109 from chamber 108 is a chamber 114 which is connected to supply line 102 by passage 115, a fixed pressure reducing restriction 116 and passage 117. Chamber 114 has a restricted orifice measuring nozzle 118 which communicates with chamber 119 at the lower side of diaphragm 99, orifice 118 coacting with a nozzle opening restricting element 121 rigid with a stem 122 that is secured to both diaphragms 99 and 101. Stem 122 is also connected to a diaphragm 123, and a control point pressure chamber 98 is provided between diaphragms 99 and 101.

Above diaphragm 123 the body is recessed to form chamber 125 which in turn is connected by passage 126 having a fixed pressure reducing restriction 127 to an annular chamber 128. An exhaust passage 129 for chamber 128 is normally closed by a flexible diaphragm 131. A chamber 132 above diaphragm 131 is connected to passage 113 by an adjustable needle valve restriction at 133 controlled by a calibrated knob 134. Passage 113 is also connected to chamber 125 by an adjustable needle valve restriction 135 controlled by a calibrated knob 136.

Passage 115 from the supply pressure line 102 is connected through a fixed restriction 137 to chamber 128, and through fixed restriction 138 to a chamber 139 below a diaphragm 141. An exhaust passage 142 for chamber 139 comprises a nozzle 140 normally closed by a disc 143 mounted on an open flexible spider 144, and disc 143 is normally urged toward nozzle closed position by a heavy spring 145 that reacts between the central diaphragm button 146 and a block 147 that is adjustable toward and from the diaphragm button 146 by a screw 148 threaded in the housing. Chambers 98 and 139 are connected by a passage 149 that may be formed in the housing if desired.

For the sake of simplicity and clarity the operation of controller 84 will be described first under the condition where the controls of needle valves 133 and 135 are disregarded.

The measured variable pressure in line 83 increases when the cartons 12 are being overloaded as when a fresh batch of higher density material is delivered to tray 191. Since the control point pressure in chamber 98 has been set at a fixed value, upon an increase in pressure in chamber 124 the stem 122 is caused to move upwardly to increase its clearance with nozzle 118. Restriction 116 being a fixed bleed from supply line 102, the pressure in chamber 114 will now decrease and diaphragm 109 will be forced upwardly by spring 108'. This upward movement of diaphragm 109 tends to open pilot exhaust valve 112 and also to close pilot inlet valve 106 to permit less air to bleed from supply line 102 to outlet line 103, and thereby decreases the control output pressure in line 103.

Should the corrective action start when the cartons are being underloaded, the reverse of the above takes place. The decreasing measured variable pressure in chamber 124 moves stem 122 downwardly to decrease the separation of element 121 and nozzle 118. The resultant increase in pressure in chamber 114 displaces diaphragm 109 downwardly, while keeping exhaust valve 112 closed, to move the pilot inlet valve 106 toward open position and increase the outlet pressure in line 103.

Thus an increase or decrease of the measured variable pressure in line 83 will result in a decrease or increase respectively in line 103 to the air motor valve 151, for a purpose to appear.

While the above described operation may be adequate for some purposes, I have found it desirable in the invention to include in the controller 84 a proportional band throttling action and an automatic reset action in order to compensate for varying product densities and to maintain the loaded carton weights as uniform as possible.

The proportional band throttling action is controlled by knob 136 and needle valve 135. The amount of opening of valve 135 proportions the output pressure of the controller in response to a given change in the measured variable pressure of line 83. When valve 135 is wide open so that chamber 125 has substantially free communication with the outlet line pressure, a change in the outlet pressure in a certain direction will act upon the pilot inlet valve to continue the change in that direction, so that the narrowest possible proportional band is attained and the pilot inlet valve substantially snaps on and off.

When valve 135 is closed, the widest proportional band is attained (determined by relative diaphragm areas and here 0–150 percent) and after a change in the measured variable pressure of line 83 the resultant change in outlet 103 will be applied to oppose the movement of valve stem 122 in response to the measured variable pressure change. Thus, with valve 135 closed, the percentage of outlet pressure change necessary to balance the measured variable pressure change will be ⅔ of the measured variable pressure change. Intermediate control is obtained by adjustment of knob 136.

The automatic reset action is controlled by knob 134 and needle valve 133 which controls the pressure of chamber 132. It balances the pilot valve at a new position as a result of a change in the outlet pressure, as due to a change in the density of the product, and holds the control action variable about that point. The output pressure of line 103 is used to automatically control this reset action, and the setting of needle 133 introduces a time delay to vary the rate of change of the reset-reference pressure of chamber 132. It periodically introduces a corrective addition or subtraction to the outlet pressure. A change in the pressure of chamber 132 results in a similar change in the pressure of chamber 125 until eventually the pressure of chamber 125 equals the new outlet pressure and the controller is in balance at the new outlet pressure.

In substance the reset adjustment causes the above described proportional band action to be repeated at predetermined intervals. When the controller is in balance the pressures in chambers 125, 128 and 132 are equal to the outlet pressure of line 103.

In summary of the action of the controller 84, a change in the pressure in line 83 due to a change in load on the scale platform results in an inverse change in the pressure of line 103. Adjustment of needle valve 135 proportionately varies the sensitivity of the response of the pilot inlet valve to such change, and this throttling action is periodically repeated with respect to a desired outlet pressure at a period determined by the setting of needle valve 133.

Outlet pressure line 103 is connected to a pilot valve 151 which in turn controls the application of a high working air pressure, say sixty pounds per square inch, from a source 152 through line 153 to the cylinder assembly 104 (Figure 1).

Referring now to Figures 7–9, a stationary air cylinder 154 contains a liner 155 in which is slidable a piston 156 rigid with a piston rod 157 that slides through the cylinder head 158. As shown in Figure 8, opposite sides of the cylinder heads are formed with rectangular grooves for slidably guiding the rectangular side members 159 of a cross head 160 which is also fixed to piston rod 157 so that the crosshead is positioned by piston 156.

Passages 161 and 162 interconnect upper and lower cylinder chambers 163 and 164 with opposite ends of a pilot valve chamber 165. A pilot spool valve 166 is slidable in valve chamber 165 and has a stem 167 rigid with the center of a diaphragm element 168 in a regulator 169 having a chamber 171 connected to line 103.

A compression spring 172 in chamber 171 urges the stem down and this is resisted by a much stronger compression spring 173 that reacts between the center of diaphragm 168 and a cup 174 mounted on one arm of a bell crank 175. A roller 176 mounted on the other arm of bell crank 175 is adapted to engage an inclined fixed cam 177 mounted on crosshead 160, the inclination of which cam may be adjusted by a control at 178. Bell crank 176 rocks about a fixed pivot 179 on a projection from casing 169.

Valve 166 is a spool valve having end members 180 and 180' which are spaced apart the distance between passages 161 and 162 and are of such size that in one position they may block both passages 161 and 162. The high pressure line 153 enters pilot valve chamber 165 midway between passages 161 and 162 and between the end of the spool valve. In the valve position shown in Figure 8, the high air pressure line 153 is connected only to passage 161 and upper cylinder chamber 163. In a lower or neutral position the valve may cut off both passages 161 and 162 from line 153, and in still a lower position the high air pressure line is connected to passage 162 and chamber 164. The position of valve 166 is controlled by the regulator 169, and the position of valve 166 controls the position of piston 156 and crosshead 160.

Referring to Figures 1 and 8, the crosshead 160 is connected by a clevis and pin to a vertically reciprocable rod 181 which in turn is pivotally connected to levers 182 and 183. Lever 182 is fulcrumed at 184 and pivotally connected at its other end to a vertically reciprocable bar 185 (Figure 11). Lever 183 is fulcrumed at 186 and pivotally connected at its other end to a vertically reciprocable bar 187.

Within the measuring machine is a power driven vertical shaft 188 on which is keyed a spider 189. A tray 191 is supported on the spider as by posts 192 and is adapted to receive flowable material continuously discharged from a conduit (not shown). A hollow sleeve 193 that rotates with shaft 188 but is longitudinally slidable with respect to shaft 188 has a bottom flange 194 and projects slidably through a suitable central opening in the bottom of tray 191.

A series of measuring cups 195 are provided around the bottom of tray 191. Each cup comprises an open ended upper cylinder 196 fixed within an opening in the bottom of the tray and a lower cylinder 197 slidably telescoped with cylinder 196 and fixed upon a carrier 198 that is secured to the lower end of sleeve 193. A bottom cup closure element 199 is pivoted on each cylinder 197 at 201 and maintained in closed position as by a tension spring 202. A cam follower roller 203 is mounted on each closure element 199 and projects outwardly therefrom for coaction with a cam 204 carried on the machine frame.

Cam 204 is mounted on a bracket 205 by spaced uprights 206 and 207 which are slotted at their upper ends to receive bolts for providing a vertical adjustment of the cam relative to bracket 205. This adjustment is made in installing the machine. Bracket 205 is vertically slidable on the machine frame 200 and is fixed at 208 to the threaded lower end of bar 187 so that vertical reciprocation of bar 187 correspondingly moves the entire cam 204 up or down.

As shaft 188 is rotated each cam follower roller 203 will successively engage inclined cam surface 209 and travel down to horizontal face 211 where it remains for a fixed angular travel of the tray, this action opening the closure element 199 and permitting downward discharge of the contents of the cup 195 into the carton below it. Preferably cam face 211 is scalloped as illustrated whereby the closure element 199 will be repeatedly jarred while open thereby providing a vibratory action that will insure complete discharge of the cup contents. After roller 203 leaves cam face 211, closure element 199 snaps back under the influence of spring 202 to close the bottom of cup 195. As shown in Figure 11, a funnel 210 is carried on spider 189 below each cup, and below the spider a rotary conveyor 212 carries a row of cartons, one below each funnel.

The lower end of bar 185 is secured as at 213 to a yoke 214 whose arms rotatably embrace sleeve 193 between fixedly spaced collars 215 and 216 on the sleeve. Thus when bar 185 is displaced vertically, carrier 198 and cylinders 197 are similarly displaced so as to simultaneously change the volume enclosed by all of the cups 195. When bar 187 is vertically displaced, cam 204 is similarly vertically displaced and the purpose of displacing the cam is to maintain it in the same relative vertical position with respect to rollers in all cup adjustment positions. In practice the maximum relative displacement of cylinders 196 and 197 is about 1 5/16 inches and the same amount of movement is provided for the cam. The lever and fulcrum locations and dimensions at 182, 184 and 183, 186 are so located as to give equal displacements of carrier 198 and cam 204 in the same direction every time rod 181 is displaced.

Operation

Loaded cartons emerge from the filling machine on belt 13 and are pushed across the scale assembly platform 21 by the succeeding cartons. The downwardly stepped arrangement of shelf 18, platform 21 and shelf 19 insures that the leading edges of the cartons do not snag when transferring between the platform and shelves.

The five cartons currently on platform 21 comprise the load to be weighed, and as above explained this load actuates the fulcrumed scale beam attached to the pressure sensitive device. The pressure in diaphragm chamber 82 opposes the upward displacement of block 45 due to the load on platform 21. In normal operation, with properly filled cartons on platform 21, the measured variable pressure in chamber 82 is a predetermined amount and is the control pressure for the entire apparatus.

The effective weight of each carton position on the platform 21 in producing a given control pressure is not equal, but the increase in output pressure of device 36 is equal to the total effective weight increase of the five cartons on the platform if all cartons are of equal weight. The carton in outermost position I of Figure 1 has the greatest effective weight and that at position V in Figure 1 has the least effective weight. The constant supply pressure in line 63 is 15 pounds per square inch and the weight 85 and adjustable counter weight 88 coact to produce a control pressure of 7.5 pounds per square inch when the scale platform is loaded with five cartons of 22.5 ounces apiece (the total weight being 7 pounds and ½ ounce).

The result of factual tests to determine the carton effective weight increases as a result of the different carton positions on the platform is tabulated below:

| Position | Weight increase, ounces | (Control) Pneumatic Pressure increase, ounces |
| --- | --- | --- |
| I | 1 | 1.6 |
| II | 1 | 1.4 |
| III | 1 | 1.0 |
| IV | 1 | 0.7 |
| V | 1 | 0.3 |
|  | 5 | 5.0 |

This proves that although each carton position produces a variable effective weight, the total increase in control pressure is equal to the total increase of the added weight on the platform. This means that any overload or underload will result in an equivalent direct change in the control pressure in line 81.

I have observed that the increase in control pressure resulting from five equal dead weighted cartons on the scale platform increases one pound when the apparatus is in continuous operation. This is probably due to the forward thrust of the belt driven cartons forcing those on the scale down the cascades of shelf 19, platform 21, shelf 18 and onto the belt 14. When the apparatus is placed in operation and accurately loaded cartons are moving across platform 21, with 15 pounds per square inch at line 63, I must adjust weight 88 until the control pressure in line 83 is 7½ pounds per square inch. Under these conditions scale beam 33 is horizontal.

The measured variable pressure of line 83 enters controller 84 and when it is at the normal value of 7.5 pounds per square inch, which means that the cartons 12 are properly filled, all of the pressures in the controller 84 are at normal values and the output pressure in line 103 is a predetermined amount which when present in regulator chamber 171 causes spool valve 166 to be positioned to cut off both passages 161 and 162 so that there is no movement of piston 156, and the measuring cylinders and cam in the filling machine maintain their positions.

Assuming now that due to a new batch of material of higher density arriving in tray 191, the cartons start being overloaded. This will result in an increase in the total weight on platform 21, and the resultant tipping of beam 33 causes valve 56 to open wider. This increases the pressure in chamber 82 and therefore the pressure in chamber 124 of controller 84 is increased. The resultant unbalance in pressure between diaphragm chambers 98 and 124 results in actuation of valve 118 to decrease the outlet pressure in line 103.

The resultant decrease in pressure in diaphragm chamber 171 permits valve stem 167 to rise, thereby connecting high pressure line 153 to passage 161 as shown in Figure 8, and piston 156 is displaced downwardly in its cylinder. As shown in Figures 1, 8 and 11, downward displacement of the piston results in upward displacement of bar 185 to cause all of the measuring cylinders 197 to move up with respect to associated cylinders 196 to decrease the volume of each measuring chamber. At the same time the cam 204 is shifted up through lever 183 and bar 187 to maintain its relative vertical level with rollers 203 on the upwardly displaced cups 197.

Less material will now be discharged into each carton and soon the reduced weight will become apparent on scale platform 21 resulting in a decrease of the force urging block 45 upwardly and permitting the higher than normal and increasing pressure in chamber 82 to urge the diaphragm downwardly. Eventually valve 56 is closed and the diaphragm drops until valve seat 48 leaves the lower end of stem 55 to open chamber 82 to the exhaust port and reduce the control pressure. When this pressure falls too low the load on the scale platform acts through beam 33 to close the exhaust valve and open the inlet valve 56. Whenever the control pressure is below its selected predetermined amount (7.5 pounds per square inch) the action of the air motor 104 is reversed to increase the filling machine measuring cylinder volume, and whenever it goes above that amount the measuring chamber volume is decreased, so that the apparatus eventually balances with the cylinders 196 and 197 properly telescoped to deliver a volume of the required weight and the control pressure of 7.5 pounds per square inch maintains balance in the system.

The response to a change in control pressure is immediate and positive so that overload or underload conditions are immediately detected and corrected.

Unless provision is made to avoid it, the cartons will be overloaded when the filling machine is operated and no cartons are on the platform 21. Overload will also take place when the machine is shut down with five cartons on platform 21 because this decreases the effective moving weight on the scale platform by one pound as explained above.

I have provided an arrangement for bypassing control by the pressure of line 83, effective under both of the above conditions, as shown in Figures 1 and 10. This comprises a solenoid actuated valve S–1 in line 83 and a solenoid actuated valve S–2 in a branch passage 150. When the motor 217 driving the carton filling machine is energized, relay 218 in its circuit is energized to pull armature 219 up to the position of Figure 10 where contact 221 bridges the contacts 222 and close the circuit to energize and open solenoid valve S–1, while contacts 223 are open so that normally closed solenoid valve S–2 remains closed.

When, however, the motor 217 is stopped, the relay is deenergized and its armature drops to open contacts 222 and close valve S–1, and to close contacts 223 and open valve S–2. This applies the fixed control point pressure of chamber 139 to chamber 124 of the controller 84 whereby equilibrium is maintained in the controller and there is no reset action of the measuring cylinders or cam in the filling machine.

A normally closed pressure switch PS–1 is installed in the output pressure line 103, and its purpose is to signal to the operator when minimum cup position exists in the filling machine. Switch PS–1 closes when the output pressure drops to zero and this engages signal lamp A–3.

In order to limit the maximum amount of material per carton under all conditions, a normally open pressure switch PS–2 and a solenoid valve S–3 are also installed in line 103 leading to the air motor pilot valve. Should the air pressure in this line exceed a predetermined amount, here 10 pounds per square inch (⅔ the travel of the air cylinder), switch PS–2 is closed so that normally open valve S–3 is closed and signal lamp A–4 is energized.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In apparatus for continuously checking and automatically correcting to a desired standard the weight of filled containers issuing from a filling machine having an adjustable volume filling device, means for conveying said filled containers away from the filling machine, a pneumatic scale having a part thereof incorporated in said conveying means to receive said moving filled containers for successively weighing said moving filled containers and producing a predetermined continuous control fluid pressure proportional to the measured filled container weight, a motor operatively connected to said device for adjusting its volume, means for operating said motor comprising a fluid pressure line having a valve, and means responsive to changes in said control fluid pressure due to deviation of the measured filled container weight from said standard for actuating said valve to apply fluid pressure to said motor for operating it to compensatively adjust said device to overcome said deviation.

2. In apparatus for continuously checking and automatically correcting the weight of filled containers issuing from a filling machine having an adjustable volume filling device, means for conveying said filled containers away from the filling machine, means having a container receiving portion thereof incorporated in said conveying means for successively weighing moving filled containers and producing a continuous control signal proportional to the measured filled moving container weight, and a motor responsive to variations in said signal operatively connected to said device for adjusting its volume to correct for any deviations in said weight from a predetermined standard.

3. In apparatus for continuously checking and automatically correcting the weight of filled containers issuing from a filling machine having a variable volume filling device, a pneumatic scale for successively weighing filled containers and producing a continuous control fluid pressure proportional to the measured filled container weight, a fluid pressure motor operatively connected to said device and responsive to variations in said control fluid pressure, a fluid pressure line for operating said motor, a reversing valve in said line, a pressure responsive device operatively connected to said reversing valve, a second fluid pressure line for said pressure responsive device, a metering valve in said second line, and means responsive to variations in said control fluid pressure for operating said metering valve.

4. In apparatus for continuously checking and automatically correcting the weight of filled containers issuing from a filling machine having a variable volume filling device, a pneumatic scale for successively weighing filled containers and producing a continuous control fluid pressure proportional to the measured filled container weight, a fluid pressure motor operatively connected to said device for adjusting the volume thereof, a control valve for said motor connected to a pressure responsive device, a fluid pressure line for said pressure responsive device containing a pilot valve for metering an outlet pressure to said pressure responsive device, and a fluid pressure control unit comprising means for balancing said control fluid pressure against a constant reference pressure and actuating said pilot valve in response to variations in said control fluid pressure.

5. In the apparatus defined in claim 4, means responsive to said outlet pressure for varying the operation of said pilot valve.

6. In the apparatus defined in claim 4, means responsive to said outlet pressure for throttling the action of said pilot valve and means also responsive to said outlet pressure for periodically repeating said throttling action.

7. In apparatus for continuously checking and automatically correcting the weight of filled containers issuing from a filling machine having a variable volume filling device and means for periodically discharging the contents of said device into a container, means for successively weighing said filled containers and producing a continuous control signal that is proportional to the filled container weight, and mechanism responsive to said signal operably connected to both said device and said discharge means for automatically correctively varying the volume of said device whenever the filled containers weigh more than a predetermined amount and at the same time adjusting said discharge means to maintain its association with said device.

8. In apparatus for continuously checking and automatically correcting the weight of filled containers issuing from a container filling machine having container content volume varying mechanism, means for conveying filled containers away from said filling machine, a scale assembly having a part incorporated in said conveying means and through which said filled containers pass after leaving said machine, a pressure sensitive device in said assembly having a continuous fluid pressure output that varies in proportion to departures of the weights of said filled containers from a predetermined amount, a fluid pressure motor operatively connected to said container content volume varying mechanism, and means operatively connecting the output of said device to control said motor so that the motor correctively actuates said mechanism whenever containers are being loaded above or below a predetermined weight by said machine.

9. In a container filling machine, means defining a variable volume chamber adapted to be periodically filled with material to be packaged, a closure for said chamber, means for periodically tripping said closure to discharge the contents of said filled chamber into a container, means for conveying filled containers away from the filling machine, means having a container handling portion thereof incorporated in said conveying means for weighing filled containers, and means operatively connected to said weighing means so as to be continuously responsive to variations in filled container weight from a predetermined amount for continuously correctively varying said chamber volume and compensatively adjusting said closure tripping means to maintain its same relative association with said closure throughout said variation.

10. In combination, a container filling machine comprising a rotatable filling unit having a plurality of circumferentially spaced measuring cups each comprising telescoped elements mounted for relative adjustment to vary the volume of each measuring cup, a closure for each cup pivoted to one of said elements, a non-rotatable cam adapted to open each said closure in succession for a predetermined period during rotation of said unit for discharging the contents of the cup into a container below it, and means automatically responsive to variations in weight of filled containers leaving said machine for simultaneously and correspondingly correctively relatively adjusting said elements and said cam.

11. In the combination defined in claim 10, said closure being pivoted to one of said elements that is moved during said volume varying adjustment.

12. In apparatus for continuously checking and automatically correcting the weight of filled containers issuing from a filling machine having a variable volume filling device, automatic weighing apparatus comprising a scale beam mounted to move about a fulcrum and a scale platform over which said issuing filled containers are continuously moved, a pressure sensitive device comprising a chamber having a movable wall connected to said beam, a fluid pressure inlet to said chamber and an exhaust for said chamber, valve means operatively connected to said wall and disposed to open said inlet and close said exhaust when the wall moves in one direction and to close the inlet and open the exhaust when the wall moves in the opposite direction, a continuously open control pressure outlet for said chamber, an adjustable counterbalance on said beam for providing a continuous outlet control pressure of a predetermined value less than the inlet pressure when there is a predetermined load of filled containers acting on said scale beam, and means responsive to variations in said outlet control pressure from said predetermined value for compensatively adjusting said variable volume filling device to correct for deviations from a standard filled container weight.

13. In apparatus for continuously checking and automatically correcting the weight of filled containers issuing from a filling machine having a variable volume filling device, a scale for successively weighing said filled containers and producing a continuous control fluid pressure proportional to the measured filled container weight, an actuating member operatively connected to said device, a fluid pressure motor having a piston rod operatively connected to said member, a fluid pressure line connected to said motor and having a reversing valve for selecting opposite displacements of said piston, and means responsive to said control fluid pressure for actuating said reversing valve to maintain said piston rod against displacement when said filled containers have a desired weight and for actuating said motor to correctively adjust said device when the filled containers become overloaded or underloaded.

14. In apparatus for continuously checking and automatically correcting the weights of filled containers issuing from a filling machine having an adjustable volume filling device, a support, a generally horizontal scale platform over which continuously move filled containers issuing from said machine, said platform being pivoted near one end on said support, a pressure sensitive device comprising a casing mounted on said support and having an internal chamber, a flexible diaphragm closing one side of said chamber, a scale beam pivoted on said support and connected adjacent one end to said diaphragm, means adjustably connecting the other end of said scale beam to the other end of said platform, a constant fluid pressure inlet to said chamber, a fluid pressure outlet from said chamber, valve means within the chamber operatively connected to said diaphragm for controlling the transmitted fluid pressure in said outlet in response to beam displacements caused by the load on said platform, adjustable means counterbalancing said beam to provide a predetermined fluid outlet pressure lower than said inlet pressure when there is a predetermined load on said platform and means responsive to variations in said outlet pressure from said predetermined value for correctively adjusting said filling device to compensate for deviations from a standard filled container weight.

15. In the apparatus defined in claim 14, means for adjusting said casing and beam as a unit with respect to said scale platform for varying the ratio of output pressure to load on the platform.

16. In apparatus for continuously checking and automatically correcting the weight of filled containers issuing from a filling machine having a variable volume filling device, a scale having a platform over which pass filled containers issuing from the filling machine, a pneumatic system having a fixed part and a movable part, means operatively connecting the movable part to the platform whereby filled container weights are successively balanced against a fluid pressure in said pneumatic system and said pneumatic system produces a continuous control fluid pressure proportional to the measured filled container weight, and a motor operatively connected to said device and responsive to variations in said control fluid pressure.

17. In apparatus for continuously checking and automatically correcting the weight of filled containers issuing from a filling machine having an adjustable volume filling device, means for conveying said filled containers away from the filling machine, means having a moving container receiving portion incorporated in said conveying means for successively weighing moving filled containers and producing a continuous control signal proportional to the measured filled container weight, a motor responsive to variations in said control signal operatively connected to said device for adjusting its volume to correct for deviations in said weight from a predetermined standard, and means operative when there are no moving containers on said portion or when said filling machine is shut down for rendering said motor independent of said control signal and maintaining the adjusted position of said device.

18. In apparatus for continuously checking and automatically correcting the weight of filled containers issuing from a filling machine having an adjustable volume filling device, a pneumatic scale for successively weighing moving filled containers and producing a continuous control fluid pressure proportional to the measured filled container weight, a motor operatively connected to said device for adjusting its volume, means for operating said motor comprising a fluid pressure line having a valve and means responsive to changes in said control fluid pressure for actuating said valve, and means operative when there are no moving containers on said scale or when said filling machine is shut down for rendering said motor operating means independent of said control fluid pressure and for maintaining the adjusted position of said device.

19. In apparatus for continuously checking and automatically correcting to a desired standard the weight of filled containers issuing from a filling machine having an adjustable volume filling device, means for conveying said filled containers away from the filling machine, a pneumatic scale having a moving container receiving portion for successively weighing moving filled containers and producing a continuous control fluid pressure proportional to the measured filled container weight, a motor operatively connected to said device for adjusting its volume, a fluid pressure responsive operator connected to said motor, a fluid pressure line connected to said operator and having a pilot valve, means responsive to changes in said control fluid pressure for actuating said pilot valve to vary the pressure at the outlet side of said pilot valve, and means responsive to changes in said outlet pressure for controlling said pilot valve actuating means.

20. In the apparatus defined in claim 19, means adjustable for varying the effect of said outlet pressure changes on said pilot valve actuating means.

21. In apparatus for continuously checking and automatically correcting to a desired standard the weight of filled containers issuing from a filling machine having an adjustable volume filling device, a pneumatic scale for successively weighing moving filled containers and producing a continuous control fluid pressure proportional to the measured filled container weight, a motor operatively connected to said device for adjusting its volume, a fluid pressure responsive operator connected to said motor, a fluid pressure line connected to said operator and having a pilot valve, means responsive to changes in said control fluid pressure for actuating said pilot valve to vary the pressure at the outlet of said pilot valve, and means for applying said changes in outlet pressure to said pilot valve actuating means for proportionately opposing said actuation of said pilot valve by changes in said control fluid pressure.

22. In apparatus for continuously checking and automatically correcting to a desired standard the weight of containers filled with a pulverulent product and issuing from a filling machine having a filling device that is adjustable in volume to suit different product densities, a pneumatic scale for weighing the moving filled containers issuing from the machine and producing a continuous control fluid pressure proportional to the measured filled container weight, a motor operatively connected to said device for adjusting its volume, means for operating said motor comprising a fluid pressure line having a pilot valve and a fluid pressure responsive control unit for said motor connected to the outlet of said pilot valve, means responsive to a change in said control fluid pressure such as is caused by a change in product density in the filling machine for actuating said pilot valve to vary said outlet pressure and thereby operate the motor to adjust said filling device to a new volume corresponding with said standard filled container weight, means for resetting said pilot valve to a position to provide an outlet pressure in said line corresponding to the adjusted position of said filling device, and means responsive to said outlet pressure for opposing actuation of said pilot valve by changes in said control fluid pressure.

23. In combination with apparatus for similarly filling cartons with fluent material, a continuous conveyor for removing filled cartons from said apparatus, a scale platform in the path of said conveyor and over which said filled cartons are pushed in close succession, said platform being of such length that it may be occupied at the maximum by a predetermined number of filled cartons at any instant, means operably connected to the scale platform for producing a control fluid pressure proportional to the weight of the filled cartons moving therealong, means for adjusting the fluent material discharge of said filling apparatus, and means responsive to deviation of said control fluid pressure from a predetermined value corresponding to a desired individual filled carton weight for automatically actuating said adjustment until filled cartons of said desired weight are moving along said platform.

24. In the combination defined in claim 23, means operable to maintain the filling machine adjustment when the cartons on said scale platform are not moving.

25. In the combination defined in claim 23, means operable to maintain the filling machine adjustment whenever less than said predetermined number of cartons occupies said scale platform.

26. In combination with apparatus for filling containers with fluent material through variable volume discharge means, means for conveying filled containers away from said filling apparatus, means having a filled container receiving portion incorporated in said conveying means for successively weighing moving containers issuing from said apparatus and producing a continuous control fluid pressure proportional to measured filled container weight, a fluid motor operably connected to effect adjustment of said variable volume discharge means, a fluid pressure control line for said motor, valve means in said control line, and means responsive to said control fluid pressure such as may be caused by a variation in material density for positioning said valve to determine the actuating pressure supplied by said line to control said motor and whereby deviation of said control fluid pressure from a predetermined value corresponding to desired filled container weight results in such repositioning of said valve as to change said actuating pressure to actuate said motor to adjust said volume discharge means to so change the amount of material discharged into each container until said desired filled container weight is attained.

27. In combination with apparatus for filling containers with fluent material through variable volume discharge means, means for successively weighing moving containers issuing from said apparatus and producing a continuous control fluid pressure proportional to measured filled container weight, a fluid motor operably connected to effect adjustment of said variable volume discharge means, a fluid pressure control line for said motor, valve means in said control line, means responsive to said control fluid pressure such as may be caused by a variation in material density for positioning said valve to determine the actuating pressure supplied by said line to control said motor and whereby deviation of said control fluid pressure from a predetermined value corresponding to desired filled container weight results in such repositioning of said valve as to change said actuating pressure to actuate said motor to adjust said volume discharge means to so change the amount of material discharged into each container until said desired filled container weight is attained, and means for applying said changes in motor actuating pressure to oppose control of said valve by said control fluid pressure.

28. In combination with apparatus for filling containers with fluent material through variable volume discharge means, means for successively weighing moving containers issuing from said apparatus and producing a continuous control fluid pressure proportional to measured filled container weight, a fluid motor operably connected to effect adjustment of said variable volume discharge means, a fluid pressure control line for said motor, valve means in said control line, means responsive to said control fluid pressure such as may be caused by a variation in material density for positioning said valve to determine the actuating pressure supplied by said line to control said motor and whereby deviation of said control fluid pressure from a predetermined value corresponding to desired filled container weight results in such repositioning of said valve as to change said actuating pressure to actuate said motor to adjust said volume discharge means to so change the amount of material discharged into each container until said desired filled container weight is attained, and means operative when said desired filled container weight has been reestablished for balancing the valve in the changed motor actuating pressure condition.

References Cited in the file of this patent

UNITED STATES PATENTS

| | | |
|---|---|---|
| 2,597,831 | Willis | May 20, 1952 |
| 2,613,925 | Weber | Oct. 14, 1952 |
| 2,628,055 | Knobel | Feb. 10, 1953 |
| 2,645,447 | Clark | July 14, 1953 |
| 2,678,185 | Howard | May 11, 1954 |